(12) United States Patent
Kochis et al.

(10) Patent No.: US 8,228,676 B2
(45) Date of Patent: *Jul. 24, 2012

(54) SMALL FORM FACTOR USB BLUETOOTH DONGLE

(75) Inventors: Craig Alan Kochis, Austin, TX (US); Thomas Herbert Ramsthaler, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/715,696

(22) Filed: Mar. 8, 2007

(65) Prior Publication Data

US 2008/0025008 A1    Jan. 31, 2008

Related U.S. Application Data

(63) Continuation of application No. 10/940,253, filed on Sep. 14, 2004, now Pat. No. 7,245,502.

(60) Provisional application No. 60/577,629, filed on Jun. 7, 2004.

(51) Int. Cl.
*H05K 1/14* (2006.01)

(52) U.S. Cl. .............. 361/737; 439/620.01; 439/660; 174/267

(58) Field of Classification Search .............. 361/737; 710/1; 439/620, 660, 22
See application file for complete search history.

(56) References Cited

U.S. PATENT DOCUMENTS

| | | | |
|---|---|---|---|
| 7,245,502 B2 * | 7/2007 | Kochis et al. | 361/760 |
| 2003/0013411 A1 * | 1/2003 | Uchiyama | 455/40 |
| 2005/0060436 A1 * | 3/2005 | Kienhoefer | 710/1 |
| 2006/0208066 A1 * | 9/2006 | Finn et al. | 235/380 |

FOREIGN PATENT DOCUMENTS

DE    10145540 A1 *   2/2003

* cited by examiner

*Primary Examiner* — Kambiz Zand
*Assistant Examiner* — Abiy Getachew
(74) *Attorney, Agent, or Firm* — Garlick & Markison; Bruce E. Garlick

(57) ABSTRACT

A small form factor USB Bluetooth dongle includes a printed circuit board (PCB), a USB contact area, and a radio frequency (RF) transceiver die. The PCB includes a first primary surface and a second primary surface. The USB contact area is fabricated on the first primary surface. The RF transceiver die is mounted on the second primary surface, wherein the RF transceiver is in accordance with Bluetooth.

24 Claims, 11 Drawing Sheets

SMALL FORM FACTOR USB BLUETOOTH DONGLE

CROSS REFERENCE TO RELATED PATENTS

This application claims priority to and is a continuation of U.S. patent application Ser. No. 10/940,253, entitled "SMALL FORM FACTOR USB BLUETOOTH DONGLE," filed Sep. 14, 2004, which claims priority to U.S. Provisional Patent Application Ser. No. 60/577,629, filed Jun. 7, 2004, both of which are incorporated herein by reference for all purposes.

BACKGROUND OF THE INVENTION

1. Technical Field of the Invention

This invention relates generally to communication equipment and more particularly to universal serial bus and Bluetooth devices.

2. Description of Related Art

As is known, for communication devices (e.g., computers, cellular telephones, printers, game consoles, control devices, personal digital assistants, etc.) to communicate, they need a wired or wireless connection. As is also known, there are many standards that dictate the signaling protocol and/or hardware protocol for wired communications and wireless communications. Further, many massed produced devices, such as computers, PDAs, cellular telephones, etc., include communication circuitry to support one or more wired and/or wireless standards. Such wired standards include Ethernet, universal serial bus, fire wire, etc., and wireless standards include IEEE 802.11, Bluetooth, and extensions thereof, etc.

For example, hardware requirements for a USB connection require a 4.5 millimeter (mm) connector opening, including the metal housing. Inside the metal housing is 3.87 mm, which leads to 1.935 mm allowed for a mating "half" of the connector. The USB contacts themselves are specified at 0.38 mm. This leaves approximately 1.55 mm between the bottom of the connector and the USB metal housing.

As a result of these requirements, current USB Bluetooth dongle designs, which essentially convert a USB connection into a Bluetooth connection, only mount devices outside of the USB connector. This then requires that the design be much longer and thus extend from a device (e.g., a personal computer (PC)) by 1 inch or more. In mobile applications, this extension is easily broken off, causing damage to not only the dongle but to the PC as well.

Therefore, a need exists for a small form factor USB Bluetooth dongle that overcomes the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
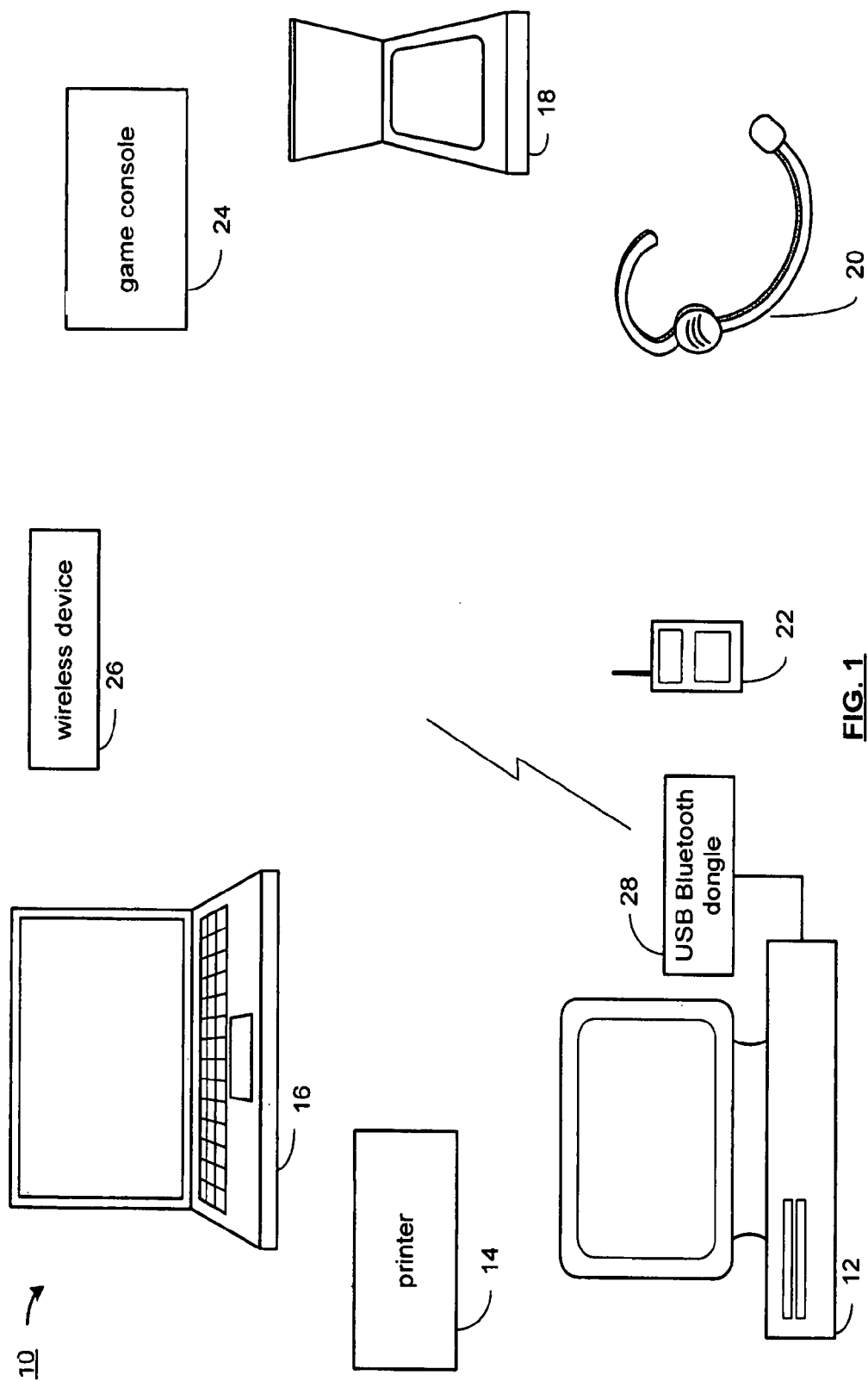
FIG. 1 is a schematic block diagram of a piconet or IBSS in accordance with the present invention.

FIG. 1 is a schematic block diagram of a piconet or an independent basic service set (IBSS) 10 that includes a plurality of communication devices 12-26. The communication devices may be personal computers (PC) 12, printers 14, laptop computers 16, personal digital assistants (PDA) 18, wireless headsets 20, handheld communication devices 22 (e.g., cellular telephones, radios, walkie-talkies, etc.), game consoles 24, and/or another other wireless device 26 that communicates data, voice, and/or text with other communication devices.

As shown, personal computer 12 includes a USB Bluetooth dongle 28, which functions to convert outbound USB communications into wireless Bluetooth communications and to convert inbound Bluetooth wireless communications into inbound USB communications. Note that other communication devices 14-26 may each include a USB Bluetooth dongle 28.

Figure 2:
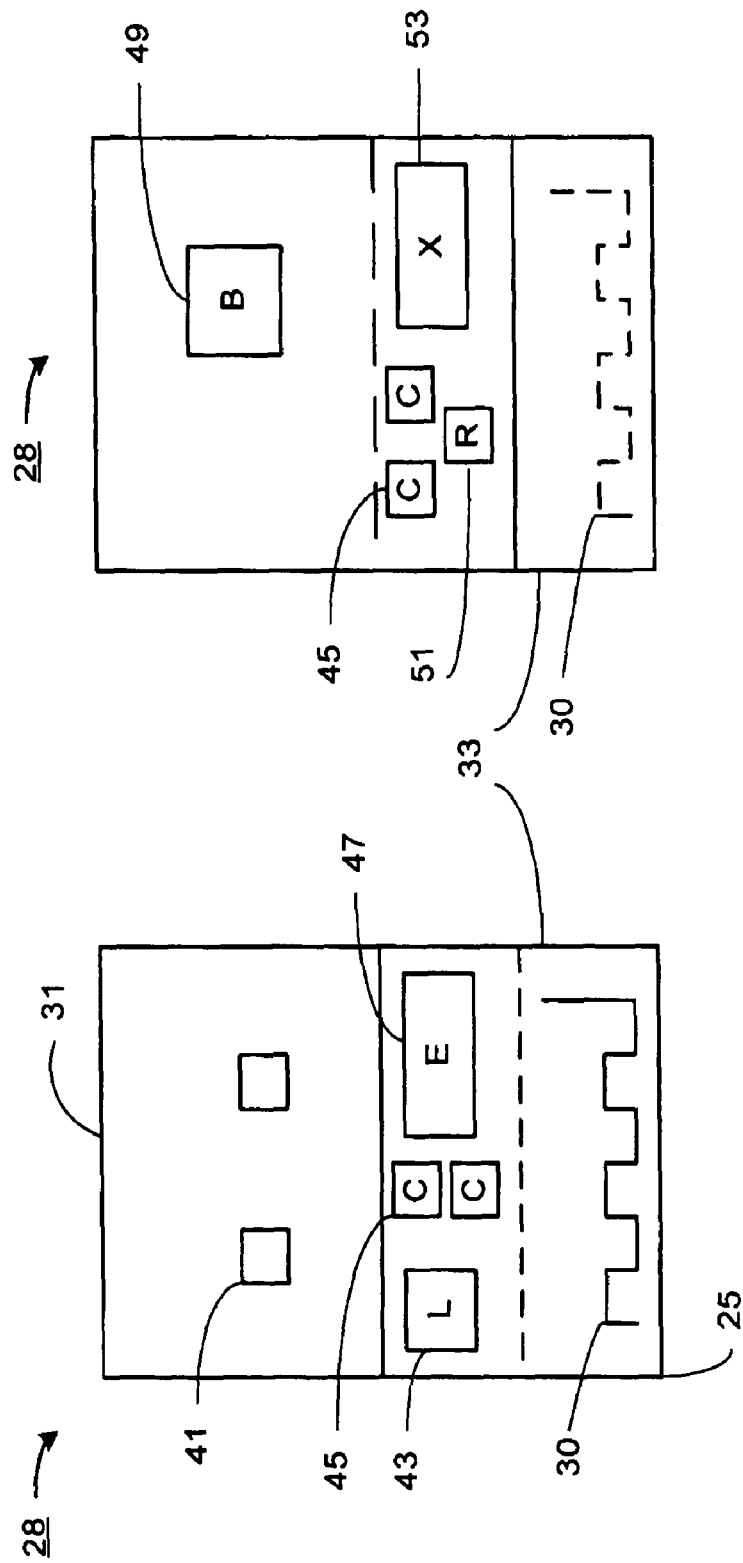
FIGS. 2A and 2B are diagrams of a USB Bluetooth dongle in accordance with the present invention.

FIGS. 2A and 2B are diagrams of an implementation of a USB Bluetooth dongle 28. In this embodiment, the USB Bluetooth dongle 28 includes a printed circuit board (PCB) 25, a plurality of circuit components, a USB contact open area 31, an antenna 30, a ground plane 33, and a radio frequency (RF) transceiver die 49 (B). The RF transceiver die 49 (B) may be a 2035 WSCSP Bluetooth die manufactured by Broadcom Corporation. In one embodiment, the plurality of circuit components includes at least one crystal 53 (X), a plurality of capacitors 45 (C), at least one LDO 43 (L), at least one resistor 51 (R), and at least one EEPROM 47 (E). As is known, EEPROM stands for electronically erasable programmable read only memory and LDO refers to a low drop out DC to DC voltage regulator.

Figure 8:
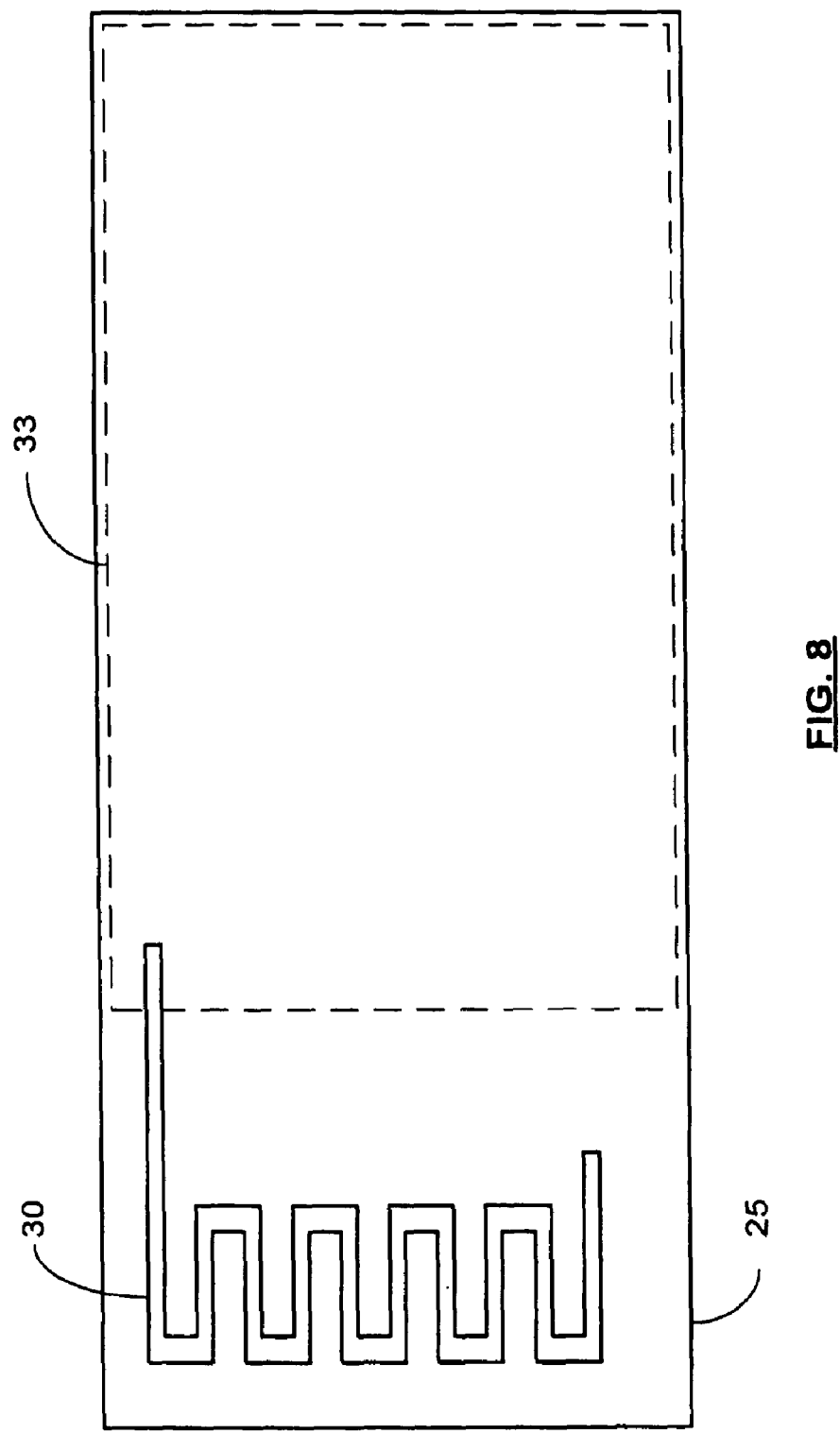
FIG. 8 is a diagram of an antenna of a USB Bluetooth dongle in accordance with the present invention.

In this illustration, the PCB 25 includes two primary surfaces (top side as shown in FIG. 2A and a bottom side as shown in FIG. 2B). As shown, the antenna 30, the EEPROM 47, at least some capacitors 45, the LDO 43, and USB contacts 41 are mounted and/or fabricated on the PCB 25 in the USB contact open area 31, which may be 8.75 mm by 13.79 mm. In one embodiment, the antenna 30 is fabricated on the PCB 25 as shown in FIG. 8. In another embodiment, the antenna 30 is an external chip, thus enabling the PCB 25 to be even smaller. In yet another embodiment, the antenna 30 is an off PCB metal antenna, again enabling the PCB to be smaller. For example, with an on-PCB antenna, the overall dongle may measure 24 mm by 13.79 mm, while, with an off-PCB antenna, the overall dongle may measure 19 mm by 12.5 mm. In either embodiment, approximately 12 mm is available for USB contact area 31.

The RF transceiver die 49 (B), the at least one crystal 53 (X), and some capacitors 45 (C) are mounted on the bottom side of the PCB 25. In this illustration, the RF transceiver die 49 (B) is radially aligned with the USB contacts 41. In other words, the RF transceiver die 49 (B) is mounted underneath the USB contacts 41. As an alternative embodiment, all of the components may be mounted on one side of the PCB 25.

The dongle 28 may further include a ground plane 33 on a surface of the PCB 25. The ground plane 33 may be on the bottom surface or on a middle layer of the PCB 25. In either implementation, the ground plane 33 provides a shield and a return for the antenna 30.

In one example embodiment, the USB Bluetooth dongle 28 of FIGS. 2A and 2B has the USB contacts 41 directly mounted on the PCB substrate, where the PCB material is approximately 0.51 mm thick. The opposite side of the PCB 25 is where RF transceiver die 49 (e.g., a BCM2035 in WSCSP packaging, which is 0.41 mm) is mounted. The remaining 0.5 mm would be insulating material UL 94-V0 per one or more versions of the USB specification and to provide some rigidity. In this example, the overall length of the module would be approximately 24 mm, which only extends from the USB connector in the PC by approximately 6.9 mm as opposed to almost an inch in prior art dongles.

Figure 3:
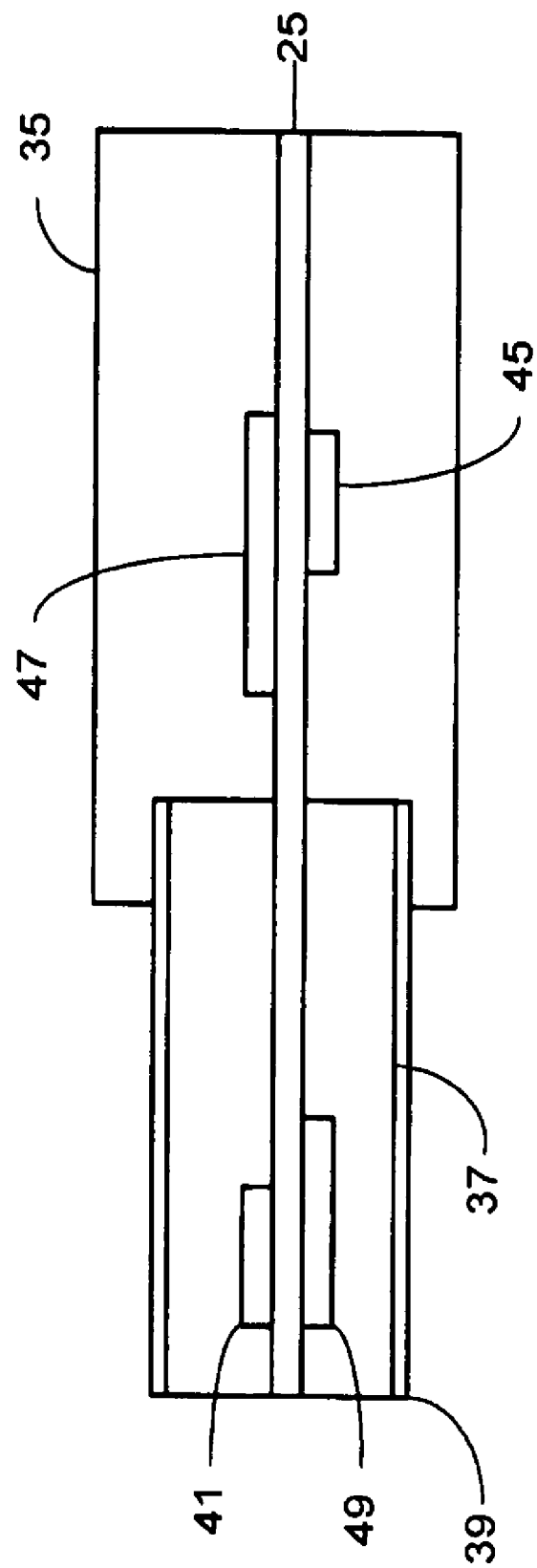
FIG. 3 is a cross sectional diagram of the USB Bluetooth dongle of FIG. 2.

FIG. 3 is a cross sectional diagram of the USB Bluetooth dongle of FIGS. 2A and 2B. As shown in this illustration, a USB contact 41 is within the USB contact area 31 and the RF transceiver die 49 (e.g., the 2035 WSCSP chip), resistors 51, and capacitors 45, once encased by a plastic filler may be enclosed via a standard USB metal shield 39. The other end of the dongle 28 may be encased in an over mold 35. Note that, in one embodiment, the PCB 25 may have a thickness of 0.51 mm and the dongle 28 may have an overall height of 7 mm, with a width of 13.79 mm and a length of 24 mm. Further note that the length may be reduced to 19 mm if the antenna is an external component. Still further note that the depth of the USB metal shield 39 may be 4.5 mm.

Figure 4:
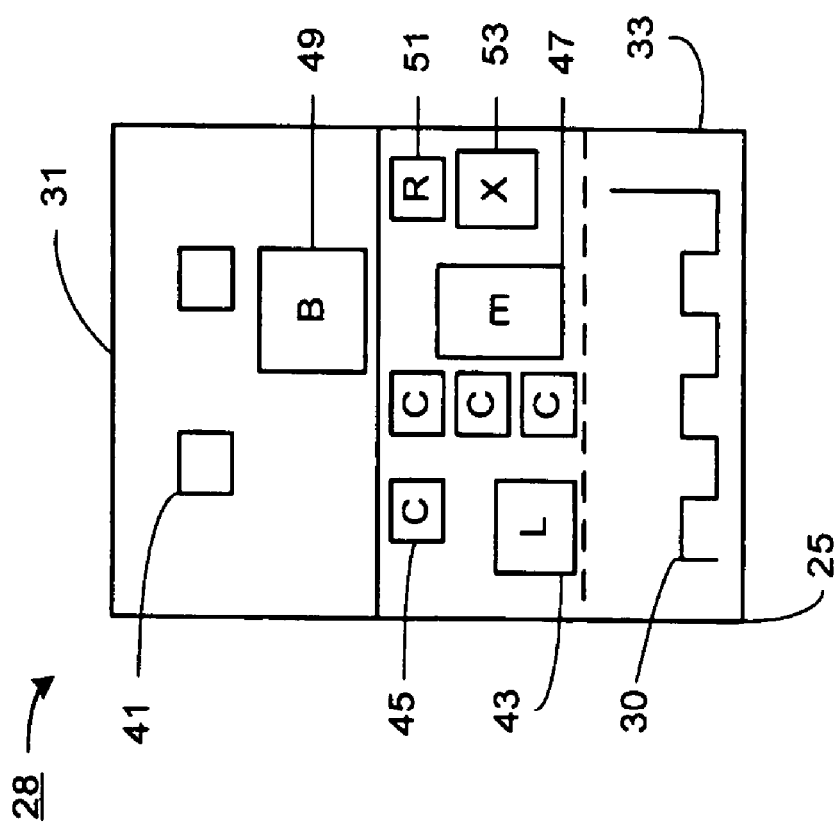
FIG. 4 is a diagram of a USB Bluetooth dongle in accordance with the present invention.

FIG. 4 is a diagram of another embodiment of a USB Bluetooth dongle 28 that includes a printed circuit board (PCB) 25, a plurality of circuit components, USB contacts 41 in the contact area 31, an antenna 30, a ground plane 33, and a radio frequency (RF) transceiver die 49 (B). The RF transceiver die 49 (B) may be a 2035 WSCSP Bluetooth die manufactured by Broadcom Corporation. In one embodiment, the plurality of circuit components includes at least one crystal 53 (X), a plurality of capacitors 45 (C), at least one LDO 43 (L), at least one resistor 51 (R), and at least one EEPROM 47 (E). In this embodiment, the majority of the components are mounted on one of the primary surfaces of the PCB. In one embodiment, the dongle 28 includes the antenna 30 on the PCB 25 and has a length of 25.5 mm and a width of 13.79 mm. In such an embodiment, the PCB may support forty five 0201 type components, four 0603 type components, and 3 0402 type components. Note that, in another embodiment, the antenna 30 may be off the PCB 25, thus reducing the length of the dongle 28.

Figure 5:
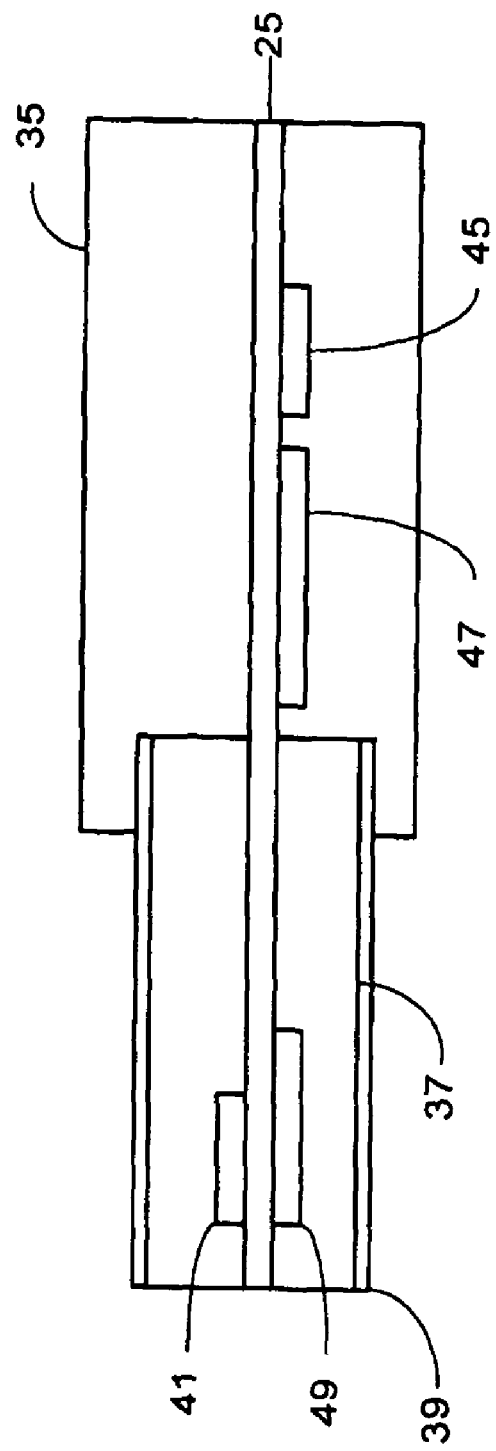
FIG. 5 is a cross sectional diagram of the USB Bluetooth dongle of FIG. 4.

FIG. 5 is a cross sectional diagram of the USB Bluetooth dongle 28 of FIG. 4. As shown in this illustration, the USB contact area 31 and the RF transceiver die 49 (B) (e.g., the 2035 WSCSP chip), resistors 51 (R), and capacitors 45 (C), once encased by a plastic filler 37, may be enclosed via a standard USB metal shield 39. The other end of the dongle 28 may be encased in an over mold 35. In this embodiment, the depth of the USB metal shield 39 is approximately 4.5 mm and the depth of the over mold 35 is approximately 7 mm. Further, the USB metal shield 39 may protrude from the over mold 35 by approximately 11.75 mm.

Figure 6:
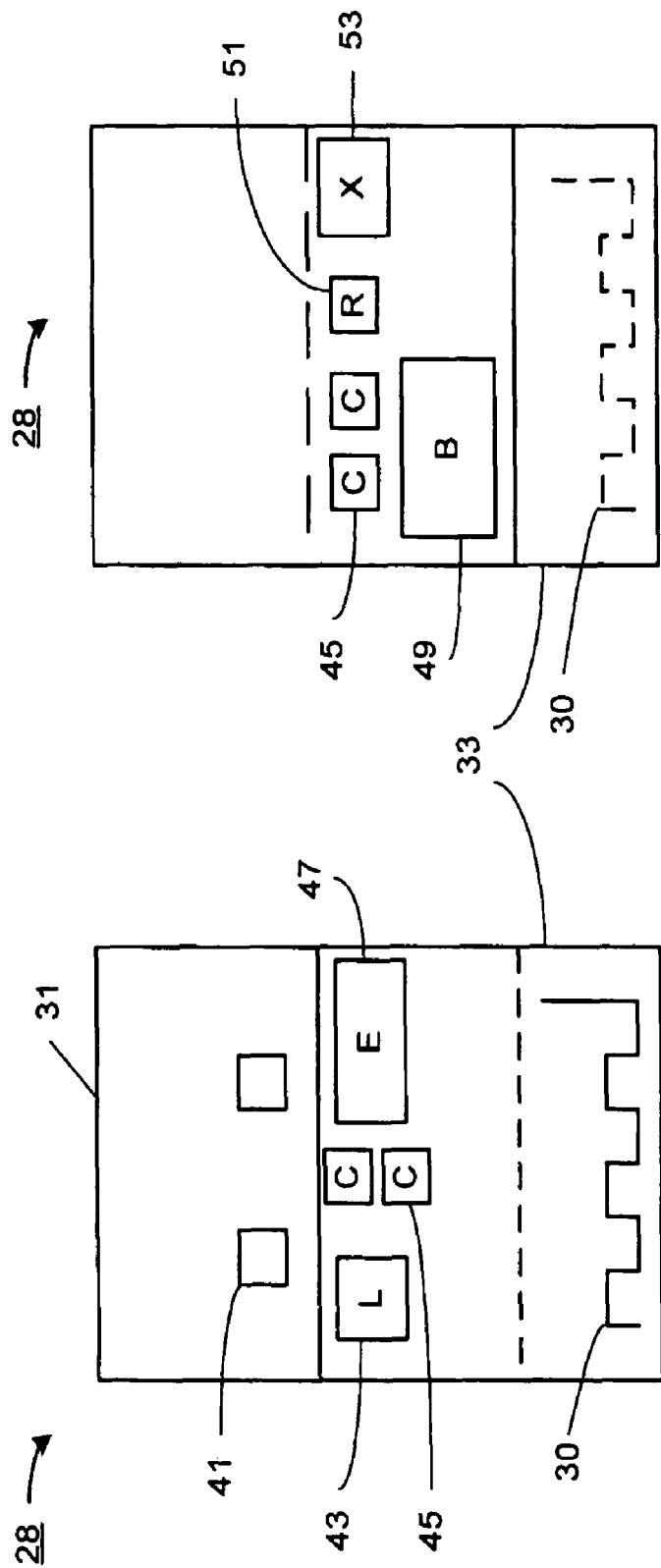
FIGS. 6A and 6B are diagrams of a USB Bluetooth dongle in accordance with the present invention.

FIGS. 6A and 6B are diagrams of yet another embodiment of a USB Bluetooth dongle 28. In this embodiment, the USB Bluetooth dongle 28 includes a printed circuit board 25 (PCB), a plurality of circuit components, USB contacts 41, an antenna 30, a ground plane 33, and a radio frequency (RF) transceiver die 49 (B). The RF transceiver die 49 (B) may be a 2035 WSCSP Bluetooth die manufactured by Broadcom Corporation. In one embodiment, the plurality of circuit components includes at least one crystal 53 (X), a plurality of capacitors 45 (C), at least one LDO 43 (L), at least one resistor 51 (R), and at least one EEPROM 47 (E). In one embodiment, the crystal 53 (X) may have dimensions of 3.2 mm by 2.5 mm by 0.75, the RF transceiver die 49 may have dimensions of 7.5 mm by 7.5 mm by 1.4 mm, the LDO 43 may have dimensions of 3 mm by 4.9 mm by 1.18 mm, and the dongle 28 may have a length of 29.9 mm and a width of 13.79 mm. Further, the PCB 25 may support forty five 0201 type components, four 0603 type components, and 3 0402 type components. Note that, in another embodiment, the antenna 30 may be off the PCB 25, thus reducing the length of the dongle 28.

In this illustration, the PCB 25 includes two primary surfaces (top side as shown in FIG. 6A and a bottom side as shown in FIG. 6B). As shown, the antenna 30, the EEPROM 47 (E), at least some capacitors 45 (C), at least one LDO 43 (L), and the USB contacts 41 are mounted and/or fabricated on the PCB 25 in the contact area 31. In one embodiment, the antenna 30 is fabricated on the PCB 25 as shown in FIG. 8.

The RF transceiver die 49 (B), the at least one crystal 53 (X), and some capacitors 45 (C) are mounted on the bottom side of the PCB 25. In this illustration, the RF transceiver die 49 (B) is not radially aligned with the USB contacts 41. In other words, the RF transceiver die 49 (B) is mounted in one surface area of the bottom surface of the PCB 25 and the USB contacts 41 are mounted in another surface area of the top surface of the PCB 25.

The dongle 28 may further include a ground plane 33 on a surface of the PCB 25. The ground plane 33 may be on the bottom surface or on a middle layer of the PCB 25. In either implementation, the ground plane 33 provides a shield and a return for the antenna 30.

Figure 7:
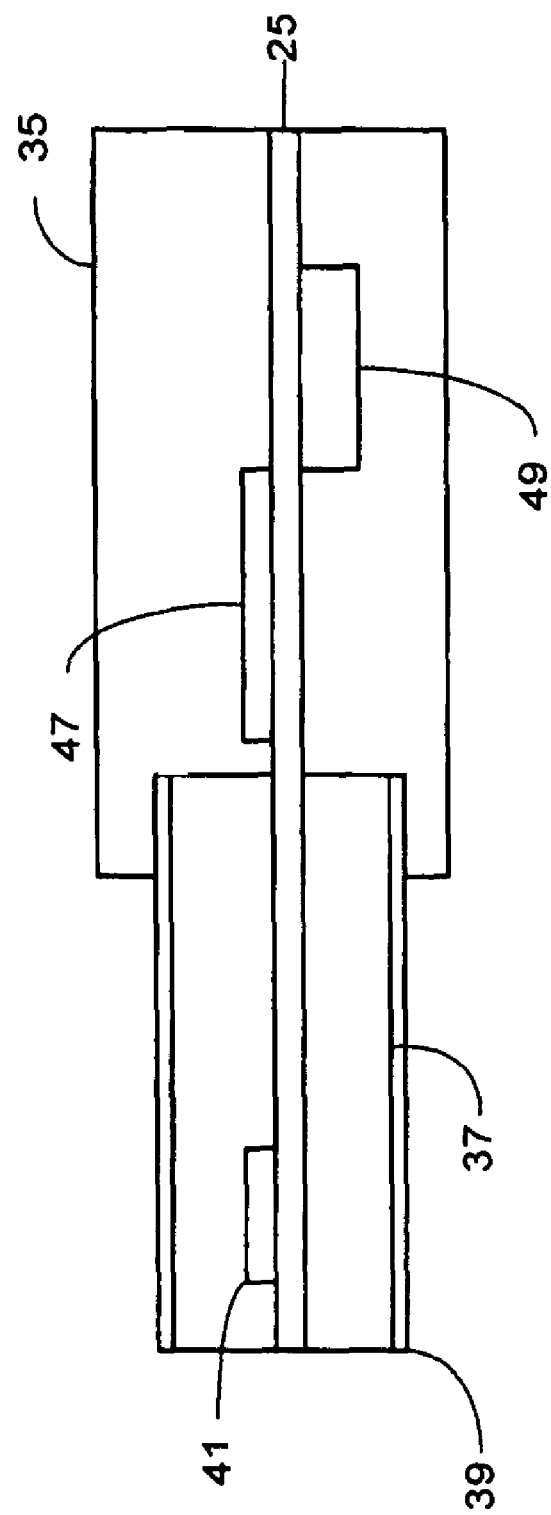
FIG. 7 is a cross sectional diagram of the USB Bluetooth dongle of FIG. 6.

FIG. 7 is a cross sectional diagram of the USB Bluetooth dongle 28 of FIGS. 6A and 6B. As shown in this illustration, the USB contact area 31 and the RF transceiver die 49 (B) (e.g., the 2035 WSCSP chip), resistors 51 (R), and capacitors 45 (C), once encased by a plastic filler 37 may be enclosed via a standard USB metal shield 39. The other end of the dongle 28 may be encased in an over mold 35.

FIG. 8 is a diagram of an antenna 30 of a USB Bluetooth dongle 28. In this embodiment, the antenna 30 includes a length corresponding to the wavelength of the signals transceived by the RF transceiver die and has a geometry as shown. The PCB 25 may further include a ground plane 33 on a different layer of the PCB than the layer on which the antenna 30 is formed. Note that an antenna test pad may be added.

Figure 9:
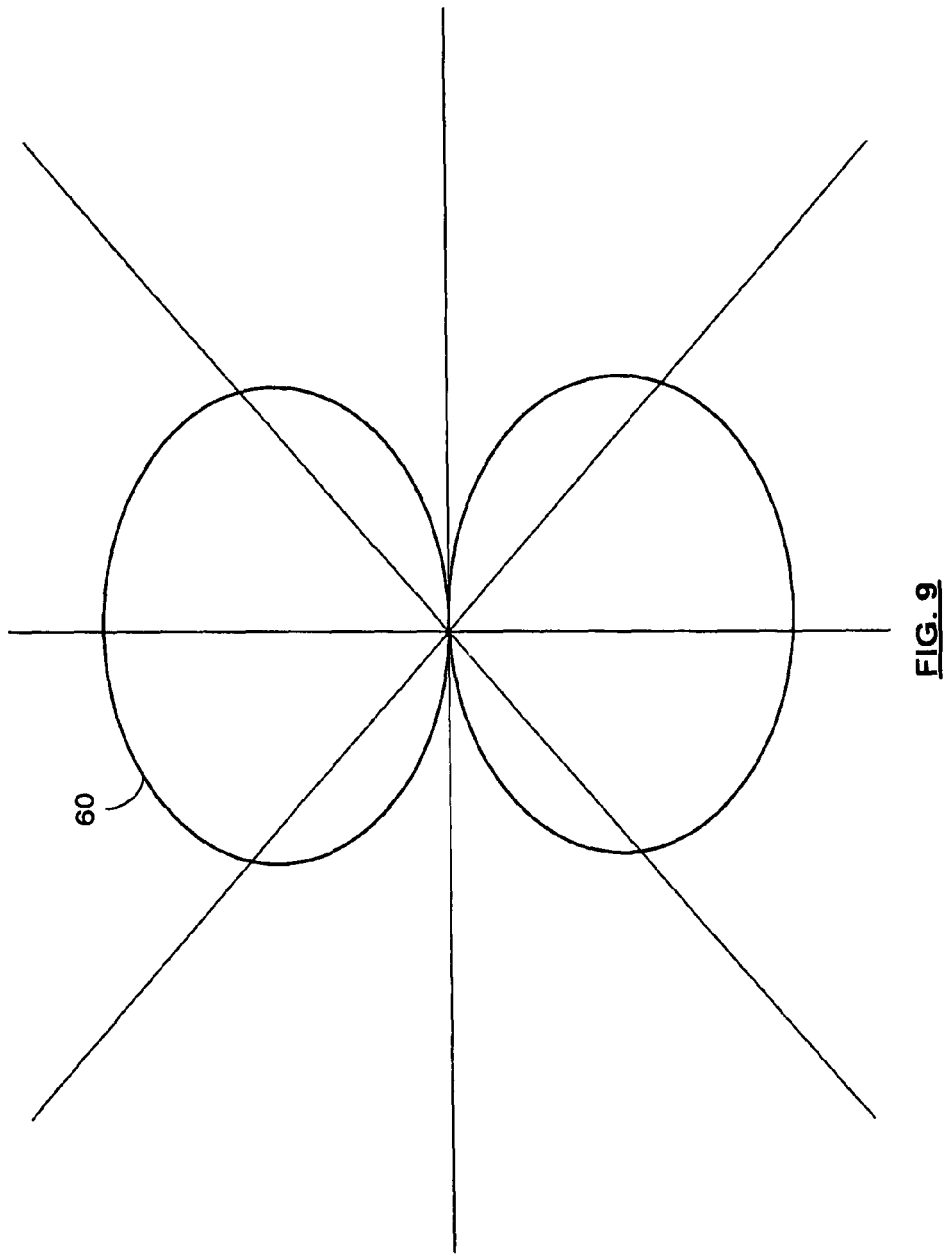
FIG. 9 is a diagram of an antenna directivity pattern illustrating operation of the antenna in accordance with the present invention.

FIG. 9 is a diagram of an antenna directivity pattern 60 (radiation in the x-y plane) of antenna 30 that plots decibels (dB) versus Phi at 2408 MHz, and the surface equals the abc minus the surface.

Figure 10:
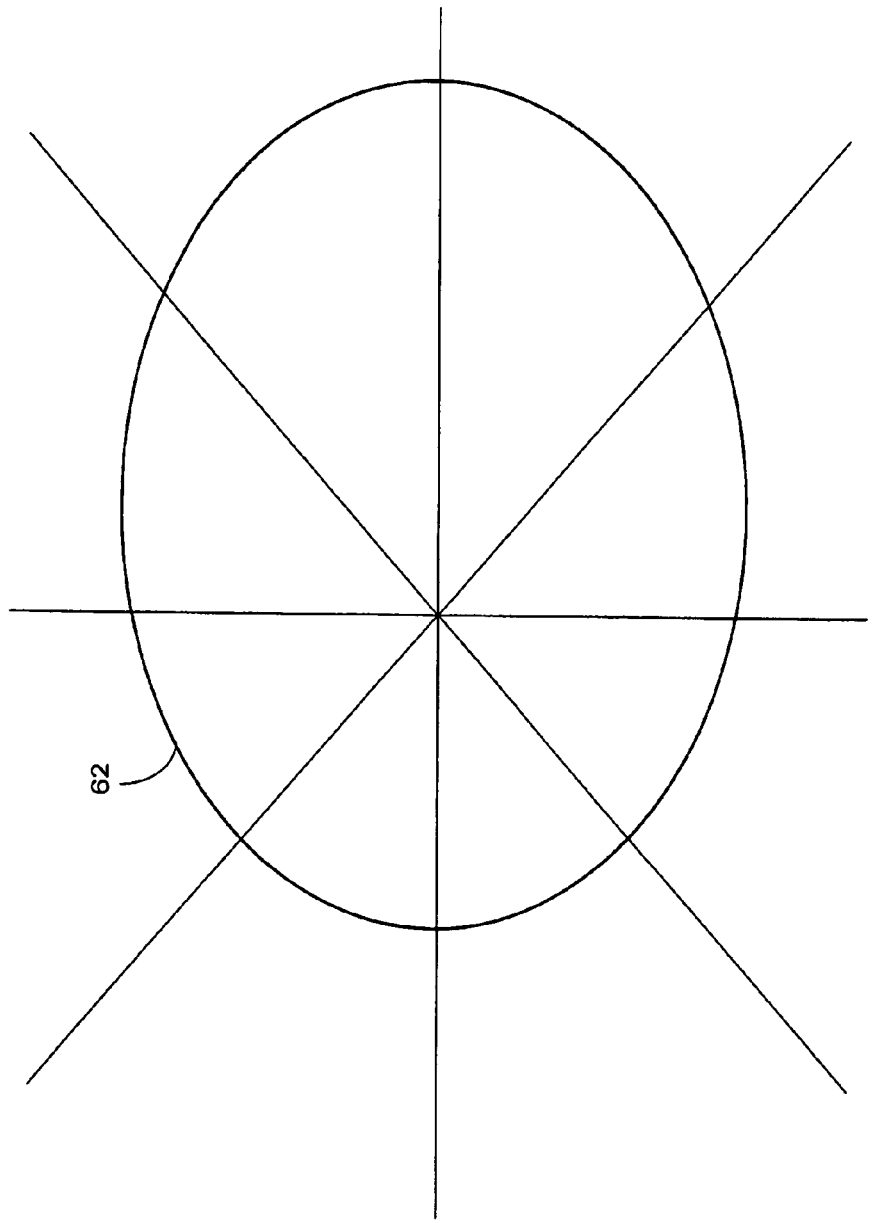
FIG. 10 is another diagram of an antenna directivity pattern illustrating operation of the antenna in accordance with the present invention.

FIG. 10 is a diagram of an antenna directivity pattern 62 (radiation in the x-y plane) of antenna 30 that plots decibels (dB) versus Phi at 2408 MHz, with a theta angle of zero, and the surface equals the abc minus the surface.

Figure 11:
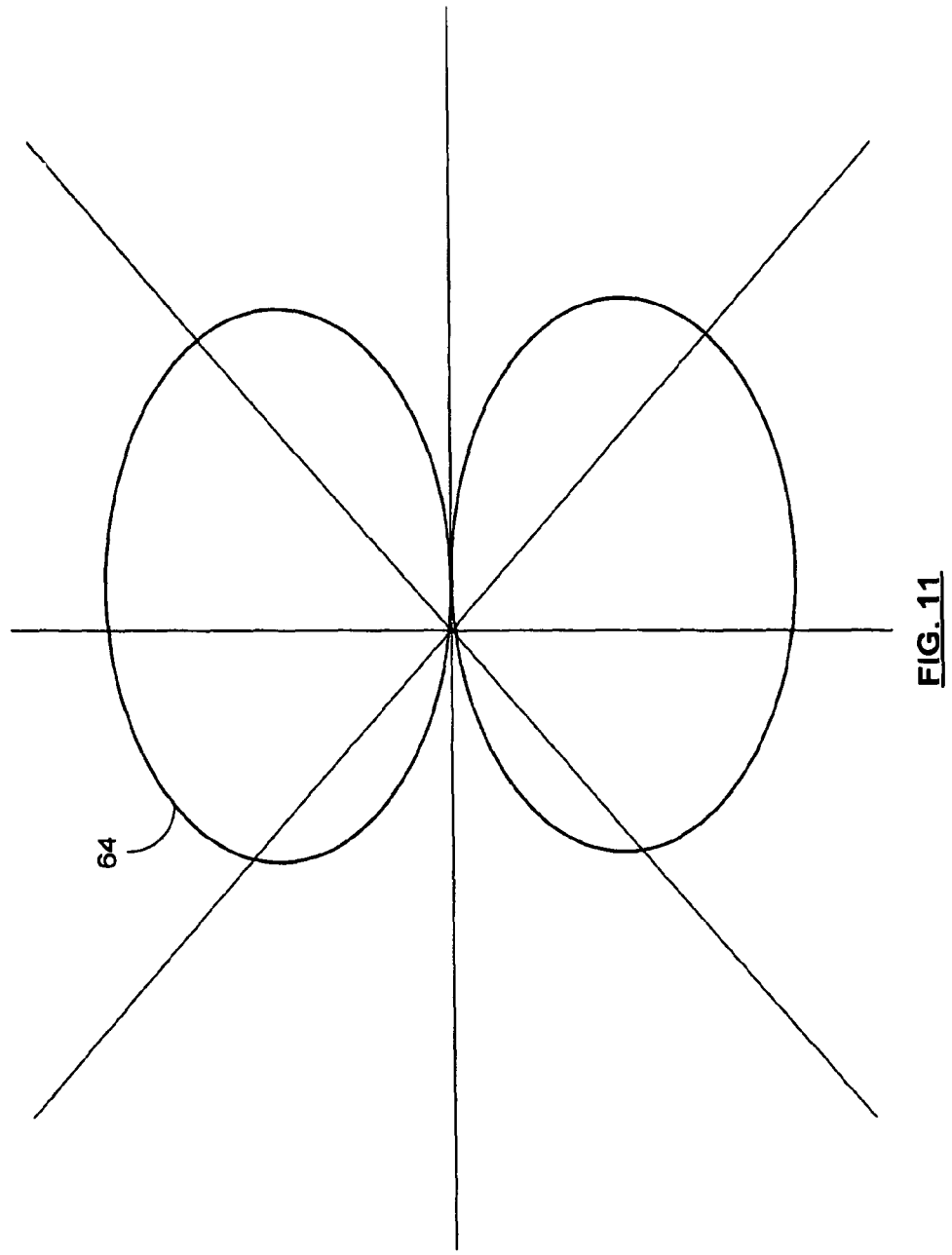
FIG. 11 is yet another diagram of an antenna directivity pattern illustrating operation of the antenna in accordance with the present invention.

FIG. 11 is a diagram of an antenna directivity pattern 64 (radiation in the x-y plane) of antenna 30 that plots decibels (dB) versus Phi at 2408 MHz, with a theta angle of ninety degrees, and the surface equals the abc minus the surface. For the diagrams of FIGS. 9-11, the radial dimensions are in degrees ranging from 0 to 360 and the x-y dimensions are in decibels ranging from −14 dB to 4 dB.

As one of average skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a small form factor USB Bluetooth dongle. As one of average skill in the art will appreciate, other embodiments may be derived from the teachings of the present invention without deviating from the scope of the claims. For instance, but in no way intended to limit additional embodiments, alternate antenna options may be used. Further, the EEPROM and the LDO may in a bundled die package.

What is claimed is:

1. A small form factor universal serial bus (USB) dongle comprising:
    a printed circuit board (PCB) having a first surface and an opposing second surface;
    a USB contact area on the first surface of the PCB; and
    a radio frequency (RF) transceiver die mounted on the opposing second surface of the PCB, wherein at least a substantial portion of the RF transceiver die resides directly opposite the USB contact area.

2. The small form factor USB dongle of claim 1, wherein the small form factor universal serial bus (USB) dongle mounts within a USB connector.

3. The small form factor USB dongle of claim 1, further comprising circuitry operable to convert between USB communications and wireless communications.

4. The small form factor USB dongle of claim 1, further comprising a USB metal shield at least partially encircling the USB contact area and the RF transceiver die.

5. The small form factor USB dongle of claim 4, further comprising a plastic filler encasing the RF transceiver die within the USB metal shield.

6. The small form factor USB dongle of claim 1, further comprising an electronically erasable programmable read only memory (EEPROM) mounted on the first side of the PCB, substantially adjacent to the USB contact area.

7. The small form factor USB dongle of claim 1, further comprising at least one of:
    an antenna formed on the PCB;
    a chip antenna mounted on the PCB; and
    an external antenna.

8. The small form factor USB dongle of claim 1, further comprising:
    a plurality of capacitors,
    at least one inductor;
    at least one resistor; and
    at least one crystal, wherein the plurality of capacitors, the at least one inductor, the at least one resistor, and the at least one crystal are mounted on one of the first side of the PCB and the opposing second side of the PCB.

9. A small form factor universal serial bus (USB) wireless communication dongle comprising:
    a circuit board having a first primary surface lying in a first plane, and a second primary surface lying in a second plane substantially parallel to the first plane; a USB contact area on the first primary surface; and
    a radio frequency (RF) transceiver die on the second primary surface, wherein at least a portion of the RF transceiver die resides directly opposite the USB contact area.

10. The small form factor USB dongle of claim 9, wherein the small form factor universal serial bus (USB) dongle mounts within a USB connector.

11. The small form factor USB dongle of claim 9, further comprising circuitry operable to convert between USB communications and a wireless communications protocol.

12. The small form factor USB dongle of claim 9, further comprising a USB metal shield at least partially surrounding the USB contact area and the RF transceiver die.

13. The small form factor USB dongle of claim 12, further comprising a filler encasing the RF transceiver die within the USB metal shield.

14. The small form factor USB dongle of claim 9, further comprising an electronically erasable programmable read only memory (EEPROM) mounted substantially adjacent to the USB contact area.

15. The small form factor USB dongle of claim 9, further comprising at least one of:
    an antenna formed on the circuit board;
    a chip antenna mounted on the circuit board; and
    an external antenna.

16. The small form factor USB dongle of claim 9, further comprising:
    a plurality of capacitors,
    at least one inductor;
    at least one resistor; and
    at least one crystal, wherein the plurality of capacitors, the at least one inductor, the at least one resistor, and the at least one crystal are mounted on at least one of the first and second primary surfaces.

17. A small form factor universal serial bus (USB) dongle comprising:
    a printed circuit board (PCB) having a first primary surface and a second primary surface on different faces of the PCB;
    a USB contact area on the first primary surface and a secondary area on the first primary surface, the second area being separate from and adjacent to the USB contact area; and a radio frequency (RF) transceiver die positioned on the second primary surface, such that at least a portion of the RF transceiver die and the USB contact area are directly opposite one another.

18. The small form factor USB dongle of claim 17, wherein the small form factor universal serial bus (USB) is specially adapted to mount within a USB connector.

19. The small form factor USB dongle of claim 17, further comprising circuitry operable to convert between USB communications and wireless communications.

20. The small form factor USB dongle of claim 17, further comprising a radio frequency (RF) shield at least partially encircling the USB contact area and the RF transceiver die.

21. The small form factor USB dongle of claim 20, further comprising a filler encasing the RF transceiver die within a USB metal shield.

22. The small form factor USB dongle of claim 17, further comprising an electronically erasable programmable read only memory (EEPROM) mounted on the secondary area.

23. The small form factor USB dongle of claim 17, further comprising at least one of:
   an antenna formed on the PCB;
   a chip antenna mounted on the PCB; and
   an external antenna.

24. The small form factor USB dongle of claim 17, further comprising:
   a plurality of capacitors,
   at least one inductor;
   at least one resistor; and
   at least one crystal, wherein the plurality of capacitors, the at least one inductor, the at least one resistor, and the at least one crystal are mounted on the first and second primary surfaces.

* * * * *